US007266838B2

(12) United States Patent
Foster et al.

(10) Patent No.: US 7,266,838 B2
(45) Date of Patent: Sep. 4, 2007

(54) SECURE RESOURCE

(75) Inventors: Ward Scott Foster, Boise, ID (US); Robert John Madril, Jr., Boise, ID (US); Shell Sterling Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 900 days.

(21) Appl. No.: 10/286,121

(22) Filed: Oct. 31, 2002

(65) Prior Publication Data

US 2004/0088545 A1    May 6, 2004

(51) Int. Cl.
*H04L 9/32* (2006.01)
*G06K 19/00* (2006.01)
*G06F 21/22* (2006.01)

(52) U.S. Cl. .................. 726/6; 726/9; 726/18; 726/20; 713/176

(58) Field of Classification Search ...................... None
See application file for complete search history.

(56) References Cited

U.S. PATENT DOCUMENTS

| | | | | |
|---|---|---|---|---|
| 5,995,624 A | * | 11/1999 | Fielder et al. | 713/169 |
| 6,067,621 A | * | 5/2000 | Yu et al. | 713/172 |
| 6,508,400 B1 | * | 1/2003 | Ishifuji et al. | 235/382 |
| 6,527,177 B1 | * | 3/2003 | Ishifuji et al. | 235/382 |
| 6,836,548 B1 | * | 12/2004 | Anderson et al. | 380/28 |
| 6,983,381 B2 | * | 1/2006 | Jerdonek | 726/5 |
| 6,985,583 B1 | * | 1/2006 | Brainard et al. | 380/44 |
| 2006/0155855 A1 | * | 7/2006 | Hamai | 709/227 |

* cited by examiner

*Primary Examiner*—Christopher Revak

(57) ABSTRACT

Preventing replay attacks without user involvement. A method according to one embodiment of the invention includes recording a serial number that was verified following a previous request to access a resource, and later receiving a request to access the resource. A serial number is acquired from the source of the request and then updated by increasing its value. The updated serial number is verified by comparing it with the recorded serial number, and access to the resource is granted only if the value of the updated serial number exceeds the value of the recorded serial number.

34 Claims, 4 Drawing Sheets

| CLIENT DATABASE ||
|---|---|
| RESOURCE | SERIAL NUMBER |
| www.resource(1).com | 004 |
| www.resource(2).com | 125 |
| . . . | . . . |
| www.resource(n).com | 018 |

FIG. 3

| SERVER DATABASE ||
|---|---|
| USER | SERIAL NUMBER |
| user(1) | 004 |
| user(2) | 475 |
| . . . | . . . |
| user(n) | 128 |

FIG. 4

SECURE RESOURCE

FIELD

The present invention is directed to accessing a distributed resource. More particularly, the invention is directed to securely accessing a resource while preventing replay attacks.

BACKGROUND

In a basic desktop computing environment, a computer, accessing data from its hard drive, performs a specified function such as word processing, displaying information on a screen, and, when requested, producing a document on a connected printer. In a distributed computing environment, the resources found in the desktop environment are spread across any number of interconnected devices. For example, a client accesses a resource over the Internet. Accessing data provided by the client or located and retrieved from another device, the resource performs specified tasks. These tasks include, among a multitude of others, manipulating the data as instructed, returning the data for use by the client, and/or sending data to a printer for production.

The following provides a more specific example of a distributed computing system utilized to print documents. A client computer, utilizing a web browser and the Internet, accesses a web server providing a document printing resource. The web server may be running on a device connected to or networked with one or more printers. Alternatively, the web server may be embedded in the printer itself. The printing resource locates available printers and a data resource managing electronic documents. The printing service then returns to the browser a graphical interface containing user accessible controls for selecting a document from the data resource as well as controls for selecting a printer. Selections made through the interface are returned to the printing resource. Accessing the data resource, the printing resource retrieves and/or sends the selected document to the selected printer for production.

Accessing distributed resources raises a number of security considerations. Access to a resource may be limited for commercial or privacy purposes. Using the example above, a user may be a paid subscriber enabling access to the printing resource. The user may pay a flat rate or may pay for each use. For commercial security, the user may be required to present credentials such as a user name and password in order to access the printing resource. The same may be true for the data resource. However, presenting credentials to the data resource also promotes user privacy. A user may store documents on the data resource that the user desires to keep private and secure.

Network communications can be intercepted. Where an intercepted communication is a request to access a resource that includes a user's credentials, that communication can be resubmitted to a resource at a later time without the user's knowledge or consent. This resubmission is commonly referred to as a replay or playback attack. Because the resubmission includes verifiable credentials, access to the resource is granted. Existing methods for preventing replay attacks involve routinely changing a user's credentials. However, such changes inconvenience the user who is required to continually remember new passwords.

SUMMARY

Accordingly, the present invention is directed to preventing replay attacks requiring no user involvement. A method according to one embodiment of the invention includes recording a serial number that was verified following a previous request to access a resource, and later receiving a request to access the resource. A serial number is acquired from the source of the request and then updated by increasing its value. The updated serial number is verified by comparing it with the recorded serial number, and access to the resource is granted only if the value of the updated serial number exceeds the value of the recorded serial number.

DESCRIPTION OF THE DRAWINGS

FIG. 3 is a table illustrating a client database discussed with reference to FIG. 2.

FIG. 4 is a table illustrating a server database discussed with reference to FIG. 2.

DETAILED DESCRIPTION

Figure 1:
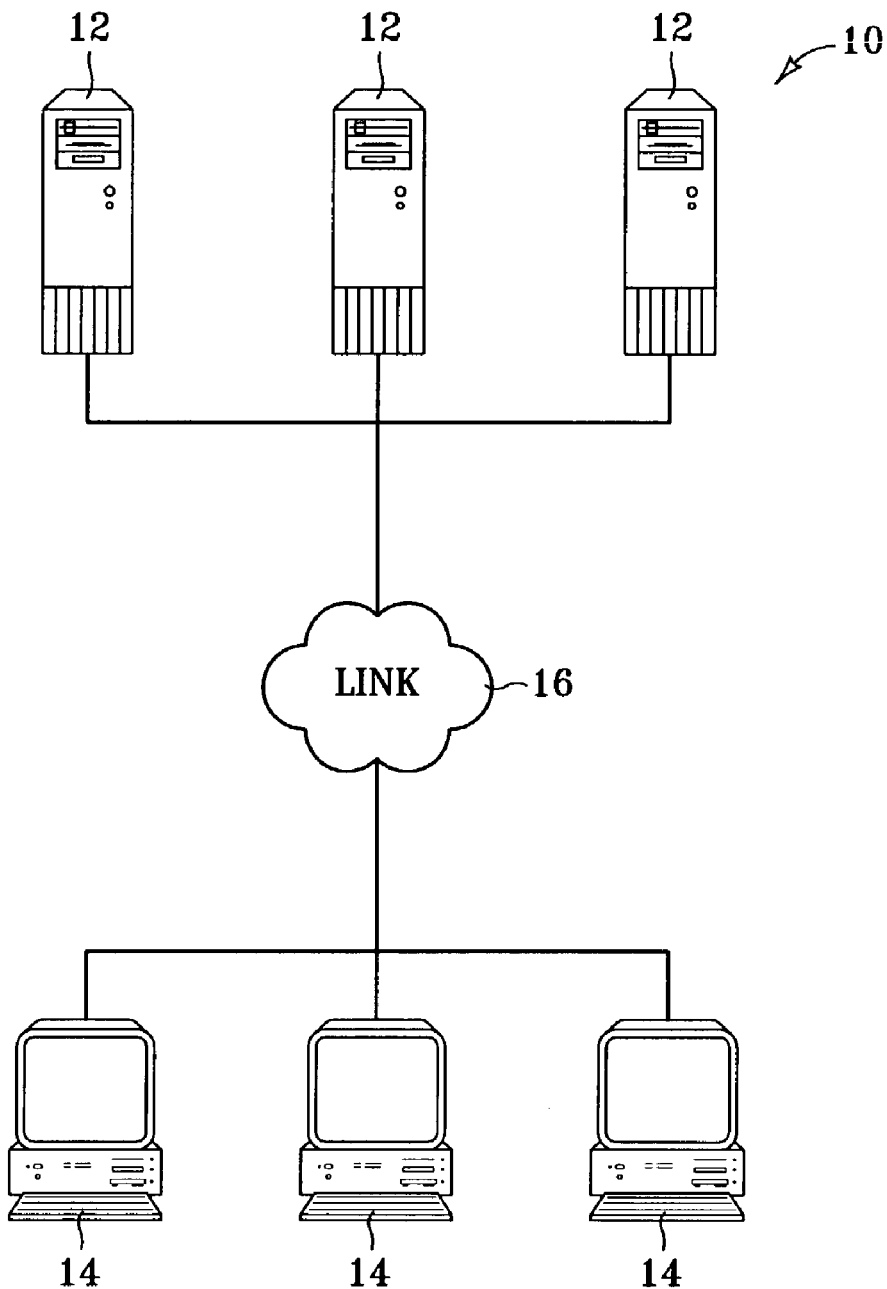
FIG. 1 is a schematic representation of a computer network in which various embodiments of the present invention may be incorporated.

Glossary:

Program: An organized list of electronic instructions that, when executed, causes a device to behave in a predetermined manner. A program can take many forms. For example, it may be software stored on a computer's disk drive. It may be firmware written onto read-only memory. It may be embodied in hardware as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components.

Client—Server: A model of interaction between two programs. For example, a program operating on one network device sends a request to a program operating on another network device and waits for a response. The requesting program is referred to as the "client" while the device on which the client operates is referred to as the "client device." The responding program is referred to as the "server," while the device on which the server operates is referred to as the "server device." The server is responsible for acting on the client request and returning requested information, if any, back to the client. This requested information may be an electronic file such as a word processing document or spread sheet, a web page, or any other electronic data to be displayed or used by the client. In any given network there may be multiple clients and multiple servers. A single device may contain programming allowing it to operate both as a client device and as a server device. Moreover, a client and a server may both operate on the same device.

Web Server: A server that implements HTTP (Hypertext Transport Protocol). A web server can host a web site or a web service. A web site provides a user interface by supplying web pages to a requesting client, in this case a web browser. Web pages can be delivered in a number of formats including, but not limited to, HTML (Hyper-Text Markup Language) and XML (extensible Markup Language). Web pages may be generated on demand using server side scripting technologies including, but not limited to, ASP (Active Server Pages) and JSP (Java Server Pages). A web page is typically accessed through a network address. The network address can take the form of an URL (Uniform Resource Locator), IP (Internet Protocol) address, or any other unique addressing mechanism. A web service provides a programmatic interface which may be exposed using a variety of protocols layered on top of HTTP, for example, SOAP (Simple Object Access Protocol).

Interface: The junction between a user and a computer program providing commands or menus through which a user communicates with the program. The term user represents generally any individual, mechanism, or other programming desiring to communicate with the program. For example, in the client-server model defined above, the server usually generates and delivers to a client an interface for communicating with a program operating on or controlled by the server device. Where the server is a web server, the interface is a web page. The web page, when displayed by the client device, presents a user with controls for selecting options, issuing commands, and entering text. The controls displayed can take many forms. They may include push-buttons, radio buttons, text boxes, scroll bars, or pull-down menus accessible using a keyboard and/or a pointing device such as a mouse connected to a client device. In a non-graphical environment, the controls may include command lines allowing the user to enter textual commands. Where the user is another program, an interface may be a programmatic interface.

INTRODUCTION: In distributed computing environments, a user employs a client to request access to a network resource. The request includes the user's credentials which are required to be verified before access to the resource is granted. The various embodiments of the present invention described below help prevent a third party from intercepting and later resubmitting the request in a replay attack.

Although the various embodiments of the invention will be described with reference to the computer network 10 shown schematically in FIG. 1, the invention is not limited to use with network 10. The invention may be implemented in or used with any computer system in which it is necessary or desirable to access electronic data. The following description and the drawings illustrate only a few exemplary embodiments of the invention. Other embodiments, forms, and details may be made without departing from the spirit and scope of the invention, which is expressed in the claims that follow this description.

Referring to FIG. 1, computer network 10 represents generally any local or wide area network in which a variety of different electronic devices are linked. Network 10 includes server devices 12 and client devices 14 interconnected by link 16. Server devices 12 represent generally any computing devices capable of running programming for distributing resources over network 10. A resource, for example, may be a web page or a web service or any other programming or data capable of being distributed over network 10. Client devices 14 represent generally any computing devices running programming capable of interacting with server devices 12. While network 10 is illustrated as containing a set number of server devices 12 and a set number of client devices 14, network 10 may include any number of server devices 12 and client devices 14. Moreover, a given server device 12 may function as a client device 14 when interacting with another server device 12.

Link 16 interconnects devices 12 and 14 and represents generally a cable, wireless, or remote connection via a telecommunication link, an infrared link, a radio frequency link, or any other connector or system that provides electronic communication between devices 12 and 14. Link 16 may represent an intranet, an Internet, or a combination of both. Devices 12 and 14 can be connected to network 10 at any point and the appropriate communication path established logically between the devices.

COMPONENTS: The logical components of a first embodiment of the invented resource access system will now be described with reference to the block diagram of FIG. 2 which illustrates link 16 connecting a single server device 12 to a single client device 14. Server device 12 includes resource 18 and resource server 20. Resource 18 represents generally any electronic data or programming to be served or distributed to client device 14. Resource server 20 represents generally any programming capable of distributing resource 18. It is expected that resource server 20 will also be capable of generating or otherwise providing a user interface (a resource interface) to be displayed by client device 14 enabling a user to interact with resource 18. For example, resource server 20 may be a web server capable of generating web pages for interacting with resource 18.

Client device 14 includes client 22, security module 24, serial module 26, and client database 28. Client 22 represents generally any programming capable of communicating with resource server 20. Where resource server 20 is a web server client 22, for example, may be a web browser. Security module 24 represents generally any programming capable of securing communications from client 22. When client 22 makes a request of resource server 20, security module 24 may intercept that request, add a user's credentials, typically a digital signature, to authenticate the request, and then may optionally encrypt the request using an encryption key provided by resource server 20. Authentication and encryption are examples of two forms of security. Authentication is important to verify that the user making the request is who he claims to be. Encryption allows devices 12 and 14 to exchange data rendering that data undecipherable to a third party.

Security module 24 may also add a checksum to the request. To ensure secure network communication, it is often important to verify that a request to access resource 18 has not been intercepted and altered. A checksum is a numerical value calculated, at least in part, by the number of bits that comprise an electronic message. Upon receipt of the request, if the number of bits does not match the checksum, the receiver of the message, in this case resource server 20, can assume that the request contains errors or has been altered.

Serial module 26 represents generally any programming capable of generating serial numbers that uniquely identify each request client 22 makes of resource server 20. A serial number may, for example be a numeric or alphanumeric string. Client database 28 represents any logical memory accessible by serial module 26. Before adding a checksum and encrypting a request to access resource 18, security module 24 is also responsible for adding a serial number to the request.

Figure 2:
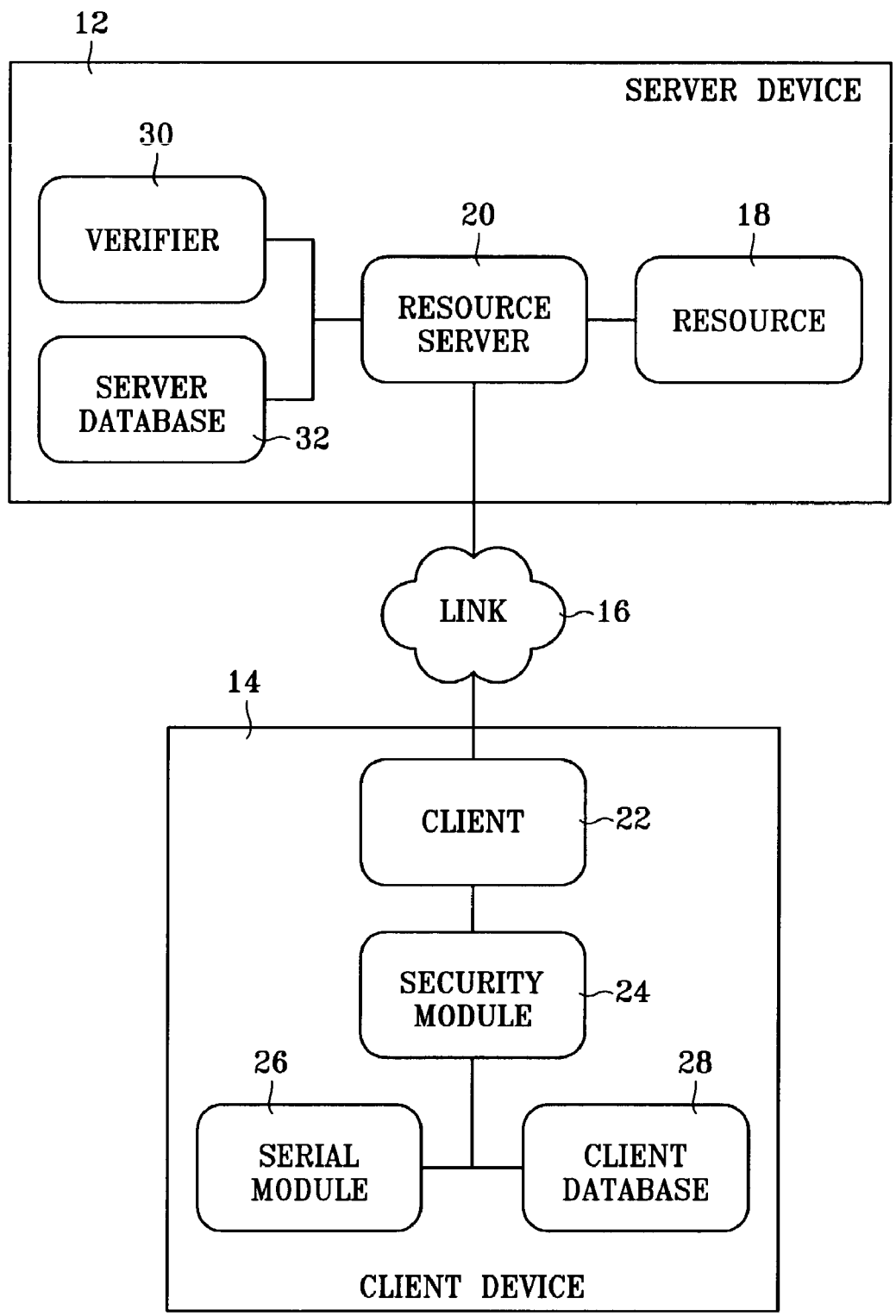
FIG. 2 is a block diagram of the network of FIG. 1 illustrating the logical program components operating on each device according to a first embodiment of the present invention.

As FIG. 2 illustrates, server device 12 also includes verifier 30 and server database 32. Verifier 30 represents any programming capable of limiting access to resource 18 to those requests containing a verifiable serial number. Server database 32 represents logical memory accessible to verifier 30.

FIG. 3 illustrates an example of client database 28. Client database 28 includes a series of entries 34. Each entry 34 includes two fields—resource field 36 and serial number field 38. The resource field 36 for a given entry 34 contains data identifying a particular resource. The serial number field 38 for a given entry 34 contains the value of the serial number provided with the last request made to a resource identified by data contained in the entry's resource field 36. In this example, the resource field of each entry 34 contains an URL (Uniform Resource Locator) through which client 22 accesses the particular resource.

Client database 28 may be located on a user's smart card. A smart card is an electronic device usually about the size of a credit card that contains electronic memory, and possibly an embedded integrated circuit (IC). Smart cards containing an IC are sometimes called Integrated Circuit Cards (ICCs). The smart card may also include the user's credentials utilized by security module 24. Where a smart card is used, client device will include a smart card reader/writer—a device enabling client device 14 to read data from and write data to the smart card. With the smart card inserted into the reader, security module 24 can acquire the user's credentials and serial module 26 can record and retrieve serial numbers. Where the smart card includes an IC, that IC may provide the programming for serial module 26 and/or security module 24 rather than client device 14.

It is important to note, however, that client database 28 is not a necessary component. Instead of maintaining a record of each serial number sent to all resources, serial module need only store the last serial number used to access any resource. For example, requests may be sent to resource A with serial number five, to resource B with serial number six, and then again to resource A with serial number seven. When receiving the second request with serial number seven, resource A remembers that the previous request from that user included serial number five. Because serial number seven is greater than serial number five it is will be honored.

Where client database 28 is used to maintain serial numbers for each resource, it is possible to tighten security and only allow requests with a serial number that is exactly one increment higher than a serial number included with a previous request. If this approach is taken, it may be necessary to reevaluate requests that may have arrived out of order. This can be accomplished by reevaluating a request periodically during a time threshold.

It is expected that client 22 will be a web browser and resource server 20 will be a web server. Security module 24 and/or serial module 26 may be provided by an extension to the browser, a Java runtime system, or a C# runtime system accessible to an applet operating within the browser. Java is a general purpose programming language with a number of features that make the language well suited for use on the World Wide Web. Small Java applications are called Java applets and can be downloaded from a Web server and run on your computer by a Java-compatible Web browser. C# is an object-oriented programming language used with XML-based Web services on and designed for improving productivity in the development of Web applications. C# boasts type-safety, garbage collection, simplified type declarations, versioning and scalability support, and other features that make developing solutions faster and easier, especially for COM+ and Web services. Alternatively, client 22 may represent programming capable of interacting with resource server 20 using remote procedure calls.

FIG. 4 illustrates an example of server database 32. Server database 32 includes a series of entries 40. Each entry 40 includes two fields—user field 42 and serial number field 44. The user field 42 for a given entry 40 contains data identifying a particular user. The serial number field 44 for a given entry 40 contains the value of the serial number provided with the last request received from a user identified by data contained in the entry's user field 42. The user field 42 of a particular entry 40 may contain data from a user's digital certificate or other user identifying data which might also be supplied with the request) used by security module 24 to sign requests from client 22. Using a digital certificate, verifier 30 can identify an entry 40 belonging to the owner of the certificate.

Figure 5:
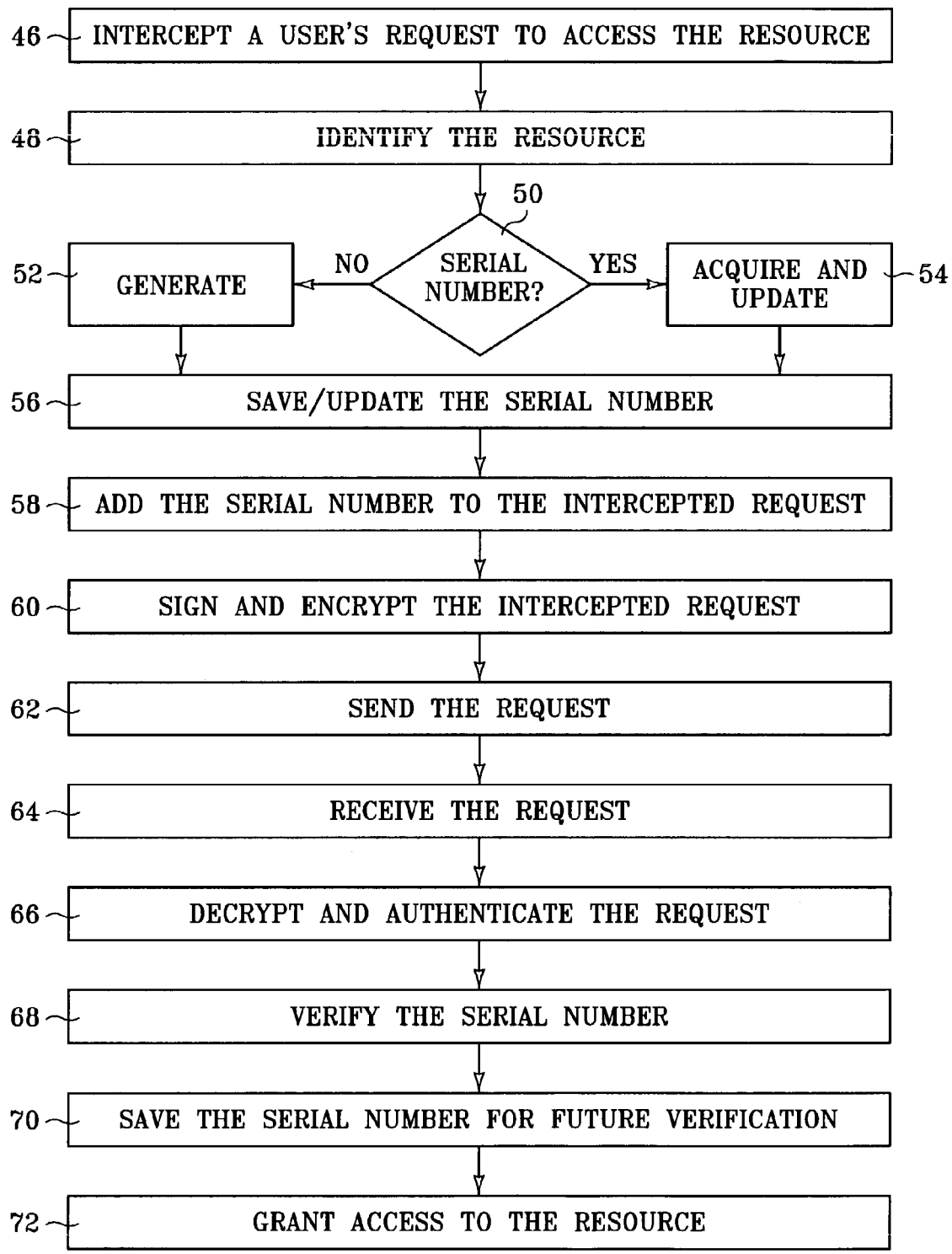
FIG. 5 is a flow diagram illustrating the steps of a secure resource access method utilizing the program components of FIG. 2.

OPERATION: The operation of the resource access system illustrated in FIGS. 2, 3, and 4 will now be described with reference to the flow diagram of FIG. 5. FIG. 5 illustrates an example of steps taken to grant a user's request to access resource 18. In this example, resource server 20 is a web server. Request to access resource 18 may be HTTP (Hyper Text Transport Protocol) requests issued by client 22.

Security module 24 intercepts from client 22 a user's request to access resource 18 (step 46), and identifies resource 18 (step 48). To identify resource 18, security module 24 may merely identify the network address or URL to which the intercepted request was directed. Security module 24 then directs serial module 26 to determine whether client database 28 contains an entry 34 and serial number for the identified resource 18 (step 50). If not, serial module 26 generates a serial number for the identified resource 18 (step 52). If the client database 28 already contains a serial number for the identified resource 18, serial module 26 acquires and updates that serial number (step 54). For example, if an acquired serial number is "123," serial module 26 might increases the number to "124."

Serial module 26 then creates or updates an entry 34 in client database 28 either saving the new serial number generated in step 52 in a new entry 34 or the existing serial number updated in step 54 (step 56). For example, where a serial number is new, serial module 26 creates a new entry 34 containing the new serial number and data identifying the resource 18 for which the serial number was generated. Where a serial number is updated, serial module 26 merely updates the entry from which the serial number was acquired with the value of the updated serial number.

Security module 24 then adds the newly generated or updated serial number to the intercepted request (step 58). Security module 24 signs the request with user credentials such as a private key associated with the user's digital certificate, encrypts the signed request, and sends it on to resource server 20 (steps 60 and 62). Resource server 20 receives and decrypts and authenticates the request (steps 64 and 66). Before the request to access resource 18 is granted, resource server 20 directs verifier 30 to verify the serial number contained in the request (step 68). If the request does not contain a verifiable serial number access is not granted.

To verify the serial number, verifier 30, using the signature used to sign the request, determines whether an entry 40 belonging to the user who issued the request exists in server database 32. If an entry 40 exists, verifier 30 acquires the serial number from the entry 40 and compares it with the serial number provided with the request. If the serial number provided with the request does not exceed the serial number from the entry 40, verifier 30 denies the request. If server database 32 does not contain an entry 40 for the user, verifier 30 creates one using the new serial number.

Where the serial number is verified or new, verifier 30 updates the entry 40 for the user with the value of the new or verified serial number (step 70). If the serial number contained in the request is new or properly verified, verifier 30 grants the request to access resource 18 (step 72).

Whether one serial number exceeds another depends upon a shared frame of reference. In one frame of reference a serial number consisting of the character "A" may exceed a serial number consisting of the character "B." The opposite may be true in another frame of reference. Depending upon the chosen frame of reference, increasing the value of a serial number may involve adding a character or digit—an incremental increase of "A" to "A1." It may involve changing a character—an incremental increase of "B" to "A" or "A" to "B." More simply, it may involve altering the value of a number—an incremental increase of "123" to "124." or "124" to "123."

Requesting access to resource 18 (the request intercepted in step 46) typically involves making a remote procedure call to resource server 20. This remote procedure call will normally be made using SOAP (Simple Object Access Protocol), which "piggybacks" on top of HTTP (Hyper Text Transport Protocol)—the same protocol typically used by web browsers. Piggybacking a SOAP request on HTTP allows the request to travel through firewalls. Most enterprises allow HTTP requests to be made by clients inside the enterprise firewall to servers that reside outside the firewall.

Most remote procedure call mechanisms include a step called "marshalling". Marshalling is the process of packing up data that is related to the request made using the procedure call and sending that data to a server. It is likely that step 46 will occur during marshalling. After converting the request into a sequence of bytes suitable for transmission across the network, serial module 26 generates and appends a serial number to the request in step 58. Security module 24 then generates a digital signature from the request data assembled thus far and appends the digital signature to the request data in step 60. Finally, the request which is now signed and includes a serial number is sent in step 62.

Verifier 30 is then responsible for "demarshalling" the request. As one might imagine, demarshalling is essentially the inverse of marshalling. The data making up the request is validated by checking the digital signature in step 66. If the signature is valid, the serial number is then verified in step 68. If the serial number is valid, access to resource 18 is granted in step 72. The process then may repeat with step 46. Future requests from the user to access resource 18 will only be granted if the request includes a serial number exceeding the value of the serial number contained in the user's entry 40 in server database 32. Beneficially, if a third party intercepts and resubmits a request, that request will not contain a verifiable serial number, and the request will be denied.

CONCLUSION

The block diagrams of FIGS. 2-4 show the architecture of one implementation of the present invention. If embodied in software, each block in FIG. 2 may represent a module, segment, or portion of code that comprises one or more executable instructions to implement the specified logical function(s). If embodied in hardware, each block may represent a circuit or a number of interconnected circuits to implement the specified logical function(s).

Also, the present invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain programs and data for use by or in connection with the instruction execution system. The computer readable medium can comprise any one of many physical media. Specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Although the flow chart of FIG. 5 shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. In a computer network, a method comprising:
    recording a first serial number that was added to a previous request to access a resource;
    acquiring the first serial number;
    updating the first serial number by increasing its value;
    adding the updated serial number to a request to access the resource;
    sending the request;
    verifying the serial number added to the request by comparing it to a second serial number; and
    granting access to the resource only if the value of the updated serial number added to the request exceeds the value of the second serial number.

2. The method of claim 1, wherein acquiring, updating, adding, and sending are achieved through use of a programmatic interface.

3. The method of claim 1, wherein recording comprises recording a first serial number on user's smart card, and wherein acquiring comprises acquiring the first serial number from the user's smart card.

4. The method of claim 1, further comprising:
    signing the request; and
    authenticating the signature; and
    wherein granting access comprises granting access to the resource only if the value of the updated serial number added to the request exceeds the value of the second serial number and the signature is authentic.

5. The method of claim 4, wherein signing comprises, programming on a user's smart card signing the request.

6. The method of claim 4, wherein recording comprises recording a first serial number on user's smart card, and wherein acquiring comprises acquiring the first serial number from the user's smart card, the method further comprising acquiring the credentials from the user's smart card.

7. The method of claim 1, further comprising, after granting access, recording the serial number added to the request as a second serial number to be used to verify a serial number added to a subsequent request.

8. The method of claim 1:
wherein the act of recording comprises recording a first serial number that was added to a previous request to access a resource and associating the recorded first serial number with data identifying the resource;
the method further comprising intercepting the request to access the resource and identifying the resource to which the request is directed; and
wherein the act of acquiring comprises acquiring the recorded first serial number associated with the data identifying the identified resource.

9. The method of claim 1, further comprising:
recording a serial number that was added to a previous request to access a resource as a second serial number;
associating the recorded second serial number with data identifying a user who issued the previous request; and
identifying a user who issued the request; and
wherein the act of verifying comprises verifying the updated serial number by comparing it with the recorded second serial number associated with the data identifying the identified user.

10. In a computer network, a method comprising:
intercepting a request to access a resource;
identifying the resource;
acquiring a first serial number that was added to a previous request to access the resource;
updating the acquired serial number by increasing its value;
adding the updated serial number to the request;
sending the request;
receiving the request;
verifying the serial number added to the request by comparing it with a second serial number that was added to a previous request to access the resource; and
granting access to the resource if the value of the serial number added to the request exceeds the value of the second serial number.

11. The method of claim 10, wherein granting comprises granting access to the resource if the value of the serial number added to the request exceeds the value of the second serial number by one increment.

12. The method of claim 10, further comprising, after granting access, recording the serial number added to the request as a second serial number to be used to verify a serial number added to a subsequent request.

13. The method of claim 10, wherein the act of acquiring comprises acquiring a first recorded serial number that is associated with data identifying the identified resource.

14. The method of claim 10, further comprising identifying a user who issued the request and wherein the act of verifying comprises verifying the serial number added to the request by comparing it with a second recorded serial number associated with data identifying the identified user.

15. Computer readable media having instructions for:
recording a first serial number that was included with a previous request to access a resource;
acquiring the first serial number
updating the first serial number by increasing its value;
adding the updated serial number to a request to access the resource;
sending the request;
verifying the serial number added to the request by comparing it with a second serial number; and
granting access to the resource only if the value of the serial number added to the request exceeds the value of the recorded serial number.

16. The media of claim 15, wherein the instructions for recording comprise instructions for recording a first serial number on user's smart card, and wherein the instructions for acquiring comprise instructions for acquiring the first serial number from the user's smart card.

17. The media of claim 15, having further instructions for:
adding credentials to the request; and
authenticating the credentials; and
wherein the instructions for granting access comprise instructions for granting access to the resource only if the value of the updated serial number added to the request exceeds the value of the second serial number and the credentials are authentic.

18. The media of claim 17, wherein the instructions for adding are instructions found on a user's smart card.

19. The media of claim 15, wherein the instructions for recording comprise instructions for recording a first serial number on user's smart card, and wherein the instructions for acquiring comprise instructions for acquiring the first serial number from the user's smart card, the media having further instructions for acquiring the credentials from the user' smart card.

20. The media of claim 15, having further instructions for, after granting access, recording the serial number added to the request as a second serial number to be used to verify a serial number added to a subsequent request.

21. The media of claim 15:
wherein the instructions for recording comprise instructions for recording a first serial number that was added to a previous request to access a resource and associating the recorded first serial number with data identifying the resource;
the method having further instructions for intercepting the request to access the resource and identifying the resource to which the request is directed; and
wherein the instructions for acquiring comprise instructions for acquiring the recorded first serial number associated with the data identifying the identified resource.

22. The media of claim 15, having further instructions for:
recording a serial number added to a previous request to access a resource as a second serial number;
associating the recorded second serial number with data identifying a user who issued the previous request; and
identifying a user who issued the request; and
wherein the instructions for verifying comprise instructions for verifying the updated serial number by comparing it with the recorded second serial number associated with the data identifying the identified user.

23. Computer readable media having instructions for:
intercepting a request to access a resource;
identifying the resource;
acquiring a first serial number that was added to a previous request to access the resource;
updating the acquired serial number by increasing its value;
adding the updated serial number to the request;
sending the request;
receiving the request;
verifying the serial number added to the request by comparing it with a second serial number that was added to a previous request to access the resource; and
granting access to the resource if the value of the serial number added to the request exceeds the value of the second serial number.

24. The media of claim 23, wherein the instructions for granting include instructions for granting access to the resource if the value of the serial number added to the request exceeds the value of the second serial number by one increment.

25. The media of claim 23, having further instructions for, after granting access, recording the serial number added to the request as a second serial number to be used to verify a serial number added to a subsequent request.

26. The media of claim 23, wherein the instructions for acquiring comprise instructions for acquiring a first serial number associated with data identifying the identified resource.

27. The media of claim 23, having further instructions for identifying a user who issued the request and wherein the instructions for verifying comprise instructions for verifying the serial number added to the request by comparing it with a second serial number associated with data identifying the identified user.

28. In a computer network, a resource access system, comprising:
  a security module operable to intercept a request to access a resource;
  a serial module operable to acquire a recorded serial number added to a previous request to access the resource, the serial module further operable to update the acquired serial number by increasing its value; and the security module further operable to add the updated serial number to the request so that the request will be granted only after a verification that the updated serial number added to the request exceeds the value of the recorded serial number added to the previous request.

29. The system of claim 28, further comprising:
  a resource server operable to receive requests to access the resource; and
  a verifier operable to verify a serial number added to a received request.

30. The system of claim 29, wherein the verifier is further operable to identify a user who issued the request, to acquire a second recorded serial number added to a previously received request associated with data identifying the identified user, and to verify a serial number added to a received request by comparing it to the second recorded serial number.

31. In a computer network, a resource access system, comprising:
  a security module operable to intercept a request to access a resource;
  a serial module operable to acquire a first recorded serial number added to a previous request to access the resource, the serial module further operable to update the acquired serial number by increasing its value;
  the security module further operable to add the updated serial number to the request;
  a resource server operable to receive a request to access the resource; and
  a verifier operable to acquire a second recorded serial number added to a previous request received by the resource server, to verify the serial number added to the received request by comparing it to the second recorded serial number, and to grant the request to access the resource only if the value of the serial number added to the request exceeds the value of the second recorded serial number.

32. The system of claim 31, wherein the serial module is further operable to identify the resource to which the intercepted request is directed and to acquire a first recorded serial number that is associated with data identifying the identified resource.

33. The system of claim 31, wherein the verifier is further operable to identify a user who issued the request and to acquire a second recorded serial number that is associated with data identifying the identified user.

34. In a computer network, a resource access system, comprising:
  a means for intercepting a request to access a resource;
  a means for acquiring a first recorded serial number added to a previous request to access the resource;
  a means for updating the acquired serial number by increasing it;
  a means for adding the updated serial number to the intercepted request and sending the request;
  a means for receiving a request to access the resource; and
  a means for acquiring a second recorded serial number added to a previous request to access the resource;
  a means for verifying the serial number added to a received request by comparing it to the acquired second serial number; and
  a means for granting the request to access the resource only if the serial number added to the request exceeds the acquired second recorded serial number.

* * * * *

UNITED STATES PATENT AND TRADEMARK OFFICE
CERTIFICATE OF CORRECTION

PATENT NO. : 7,266,838 B2
APPLICATION NO. : 10/286121
DATED : September 4, 2007
INVENTOR(S) : Ward Scott Foster et al.

Page 1 of 1

It is certified that error appears in the above-identified patent and that said Letters Patent is hereby corrected as shown below:

In column 9, line 58, in Claim 15, after "number" insert -- ; --.

In column 10, line 22, in Claim 19, delete "user' smart" and insert -- user's smart --, therefor.

Signed and Sealed this

First Day of July, 2008

JON W. DUDAS
*Director of the United States Patent and Trademark Office*